United States Patent
Wada et al.

(10) Patent No.: US 7,090,478 B2
(45) Date of Patent: Aug. 15, 2006

(54) APPARATUS AND METHOD FOR MANUFACTURING AN ANISOTROPIC FORMED BODY

(75) Inventors: Hitoshi Wada, Tsukuba (JP); Tsukasa Kiyoshi, Tsukuba (JP); Masayuki Tobita, Tokyo (JP); Eiji Homma, Tokyo (JP); Hideaki Konno, Tokyo (JP)

(73) Assignees: Independent Administrative Institution National Institute for Materials Science, Tsukuba (JP); Polymatech Co., Ltd., Tokyo (JP)

(*) Notice: Subject to any disclaimer, the term of this patent is extended or adjusted under 35 U.S.C. 154(b) by 188 days.

(21) Appl. No.: 10/645,547

(22) Filed: Aug. 22, 2003

(65) Prior Publication Data
US 2004/0164462 A1    Aug. 26, 2004

(30) Foreign Application Priority Data
Feb. 24, 2003 (JP) ............................. 2003-045853

(51) Int. Cl.
*B28B 1/00* (2006.01)

(52) U.S. Cl. .............................. 425/3; 425/174; 72/54; 164/146; 264/405; 264/427

(58) Field of Classification Search ................ 425/174, 425/3; 72/54; 164/146; 264/405, 427
See application file for complete search history.

(56) References Cited

U.S. PATENT DOCUMENTS

| | | | | |
|---|---|---|---|---|
| 3,555,621 A | * | 1/1971 | Hara | 425/3 |
| 3,774,890 A | * | 11/1973 | Lemelson | 425/3 |
| 4,661,053 A | * | 4/1987 | Yokota et al. | 425/3 |
| 5,800,839 A | * | 9/1998 | Kudo et al. | 425/3 |
| 6,769,892 B1 | * | 8/2004 | Hehl | 425/3 |
| 2002/0045126 A1 | * | 4/2002 | Watanabe et al. | 430/280.1 |

FOREIGN PATENT DOCUMENTS

| | | |
|---|---|---|
| JP | 2001-264402 | 9/2001 |
| JP | 2002-124315 | 4/2002 |

* cited by examiner

*Primary Examiner*—Robert Davis
*Assistant Examiner*—G. Nagesh Rao
(74) *Attorney, Agent, or Firm*—Rader, Fishman & Grauer PLLC

(57) ABSTRACT

An apparatus for manufacturing an anisotropic formed body in which functional, magnetic fine particles are oriented in a specific direction within a matrix and in which anisotropy is given to properties attributable to the functional fine particles. The apparatus allows use of a wide variety of materials as the functional fine particles and realizes an anisotropy which is parallel and of a uniform interval within a large area. Further, a method for manufacturing an anisotropic formed body, includes applying, by using a superconducting magnet device, a uniform and parallel magnetic field with magnetic lines of force at equal intervals and parallel to each other, to a mold in which the matrix is filled with a liquid molding material containing functional, magnetic fine particles, to orient the functional fine particles in a direction of the magnetic lines of force, whereby the liquid molding material subsequently hardens.

21 Claims, 5 Drawing Sheets

APPARATUS AND METHOD FOR MANUFACTURING AN ANISOTROPIC FORMED BODY

BACKGROUND OF THE INVENTION

1. Field of the Invention

The present invention relates to an apparatus and method for manufacturing an anisotropic formed body having anisotropy to exhibit in specific directions within a matrix various properties, such as electrical conductivity, heat conductivity, expansion coefficient, light transmittance, magnetism, hardness, elasticity, water absorption, dielectric constant, gas permeability, piezoelectric characteristics, and vibration absorption. In particular, the present invention relates to an apparatus and method for manufacturing an anisotropic formed body in which anisotropy is imparted by utilizing a magnetic field.

2. Description of the Related Art

As an example of an anisotropic formed body as mentioned above, an anisotropic conductive device is known. For example, an anisotropic conductive connector for electrical connection of a microphone and a printed circuit board contained in a mobile phone is known. As an example of such an anisotropic conductive connector, there is known a formed body composed of a disc-shaped main body portion with a continuous conductive portion formed therein. The main body portion uses electrically insulating silicone rubber as a matrix. Conductive, magnetic fine particles are oriented in a specific direction to form the continuous conductive portion. This formed body is generally obtained as follows: A mold with conductive fine particles arranged therein is filled with liquid silicone rubber, and the conductive fine particles are oriented by a parallel magnetic field generated by permanent magnets embedded in the upper and lower portions of the mold so as to be opposed to each other. Then, the silicone rubber is crosslinked.

As a prior-art technical document disclosing a technique in which an anisotropic formed body is formed by utilizing the parallel magnetic field of such permanent magnets, the applicant of the present invention has referred to the following patent document.

However, in the method of forming an anisotropic formed body by utilizing the magnetic field of permanent magnets, there are limitations regarding the intensity of the magnetic field that can be generated. Thus, the functional fine particles allowing orientation and exhibiting properties such as conductivity are restricted to ferromagnetic materials such as nickel or iron. With paramagnetic materials, such as aluminum, platinum, palladium, titanium, and manganese, and diamagnetic materials, such as gold, silver, copper, metal oxide, metal nitride, metal carbide, metal hydroxide, carbon, organicpolymer, protein, and DNA, it is difficult to effect orientation so as to attain the intended anisotropy. Further, due to its weak magnetic force and unevenness in magnetic field generated by its surface irregularities, it is rather difficult for a permanent magnet to generate a uniform parallel magnetic field in a large space. Thus, it is very difficult to produce an anisotropic formed body exhibiting an anisotropy which is parallel and of a uniform interval within a large area.

SUMMARY OF THE INVENTION

In view of the above problem in the prior art, it is an object of the present invention to provide an anisotropic formed body allowing use of a wider variety of materials as the functional fine particles and realizing an anisotropy which is parallel and of a uniform interval within a large area.

To achieve the above object, the present invention basically adopts a technical concept according to which a superconducting magnet device generates a uniform and parallel magnetic field in which magnetic lines of force are arranged at equal intervals so as to be parallel to each other and a mold is placed in this uniform and parallel magnetic field to orient the functional fine particles therein. This helps to realize a uniform and parallel orientation along the magnetic lines of force constituting the uniform and parallel magnetic field even with functional fine particles that are difficult to orient by conventional permanent magnets, thus making it possible to use a wider variety of materials for the functional fine particles. Thus, it is possible to obtain an anisotropic formed body that can be used as a functional material exhibiting, uniformly and in parallel, various properties inherent in the functional fine particles, such as electrical conductivity, heat conductivity, expansivity, light transmittance, magnetism, hardness, elasticity, water absorption, dielectric constant, gas permeability, piezoelectric characteristics, and vibration absorption, and to use the anisotropic formed body in various technical fields.

As an apparatus for manufacturing an anisotropic formed body providing the action and effect based on the above technical concept, the present invention provides an apparatus for manufacturing an anisotropic formed body in which functional, magnetic fine particles are oriented in a specific direction within a matrix and in which anisotropy is given to properties attributable to the functional fine particles. The apparatus includes a super conducting magnet device that has a cylindrical super conducting coil and generates a uniform and parallel magnetic field in which magnetic lines of force at equal intervals and parallel to each other extend through a mold arranged in a barrel axis of the superconducting coil.

Further, the present invention provides a method for manufacturing an anisotropic formed body, in which a superconducting magnet device applies a uniform and parallel magnetic field with magnetic lines of force at equal intervals and parallel to each other to a mold, in which a matrix is filled with a liquid molding material containing functional, magnetic fine particles, to orient the functional fine particles in a direction of the magnetic lines of force which subsequently harden in the liquid molding material.

In the above-described manufacturing apparatus of the present invention, the cylindrical superconducting coil is composed of an upper superconducting coil and a lower superconducting coil vertically spaced apart from each other, and a gap between the coils constitutes a transfer opening for the mold. By thus using the gap between the coils as the transfer opening for the mold, it is possible to advantageously utilize the portion usually constituting a dead space of a split type superconducting magnet device equipped with upper and lower superconducting coils, thereby rationally simplifying the construction of the device. Thus, there is no need to separately form a transfer opening or to provide a transfer mechanism leading to a separate transfer opening.

The above-described manufacturing apparatus of the present invention may be equipped with a heating device for heating in the mold the liquid molding material with functional fine particles contained in the matrix. In this arrangement, it is possible to further soften through heating a synthetic resin material, such as a thermoplastic resin or a thermosetting resin, natural rubber, synthetic rubber, or an elastomer material, such as thermoplastic elastomer, so that the orientation of functional fine particles by the uniform and parallel magnetic field is facilitated. Further, in the case of using natural rubber or synthetic rubber, it is possible to crosslink the molding material.

The above-described manufacturing apparatus of the present invention may be equipped with a drive device for driving at least one of the mold and the heating device in the barrel axis direction of the superconducting coil. In this drive device, the mold and the heating device are driven in the barrel axis direction of the superconducting coil, so that it is possible to significantly utilize the internal space of the superconducting coil, making it possible to rationally simplify the construction of the device.

The above-described manufacturing apparatus of the present invention may be equipped with an injection molding device using an injection mold as the mold. Further, the manufacturing apparatus of the present invention may be equipped with a photo-setting molding device using a photo-setting mold as the mold. This makes it possible to obtain anisotropic formed bodies of various configurations and materials in which functional fine particles are oriented by a uniform parallel magnetic field.

In the above-described manufacturing apparatus of the present invention, the superconducting magnet device is equipped with a heat insulating portion. Thus, the cooling of the superconducting coil is not hindered by the heat due to the heat generating mechanism such as the heating device or the injection molding device.

Incidentally, as stated above, the functional, magnetic fine particles to be contained in the matrix are endowed with anisotropy with respect to properties, such as electrical conductivity, heat conductivity, expansion coefficient, light transmittance, magnetism, hardness, elasticity, water absorption, dielectric constant, gas permeability, piezoelectric characteristics, and vibration absorption. Specific examples of the functional fine particles include nickel, iron, cobalt, aluminum, platinum, palladium, titanium, manganese, gold, silver, copper, metal oxide, metal nitride, metal carbide, metal hydroxide, a carbon material, such as carbon fiber, graphite, or carbon nanotube, organic polymer, protein, and DNA. Examples of conductive functional fine particles include magnetic conductors, such as nickel, iron, or cobalt, or an alloy using these as main components, conductor particles consisting of copper, aluminum, gold, or silver plated with a magnetic conductor, magnetic conductor particles plated with a conductor as mentioned above, and carbon materials, such as carbon fiber, graphite, or carbon nanotube. Further, examples of functional fine particles with heat conductivity include, in addition to the above-mentioned carbon materials, metal oxide, metal nitride, metal carbide, and metal hydroxide. According to the present invention, to orient these functional fine particles by a superconducting magnet device, a uniform parallel magnetic field with a magnetic flux density of 1 to 10 T is generated. Generally speaking, it is difficult to obtain a high magnetic field of 1 T or more by using permanent magnets. Regarding the above-mentioned functional fine particles, it is possible to achieve the requisite and sufficient anisotropic orientation with a magnetic flux density of 1 to 10 T. Further, in this case, it is possible to achieve the requisite cooling of the superconducting coil by using a refrigerator cooling system that can achieve a forced-flow cooling or a conduction cooling, and an immersion cooling system, which involves immersion in a large amount of liquid helium, is not required. Thus, a superconducting magnet device of a simpler device construction suffices. In the present invention, this high magnetic field generated by the superconducting magnet device is a uniform parallel magnetic field having a diameter of 300 to 1000 mm. Thus, it is possible to obtain an anisotropic formed body and exhibiting anisotropy with respect to properties, such as electrical conductivity, heat conductivity, expansion coefficient, light transmittance, magnetism, hardness, elasticity, water absorption, dielectric constant, gas permeability, piezoelectric characteristics, and vibration absorption within a large area.

The present invention is not restricted to what has been described above. The objectives, advantages, features, and usages of the invention will be further clarified by the following description given with reference to the accompanying drawings. It should be understood that all appropriate modifications made without departing from the gist of this invention are within the scope of this invention.

DESCRIPTION OF THE PREFERRED EMBODIMENTS

Figure 1:
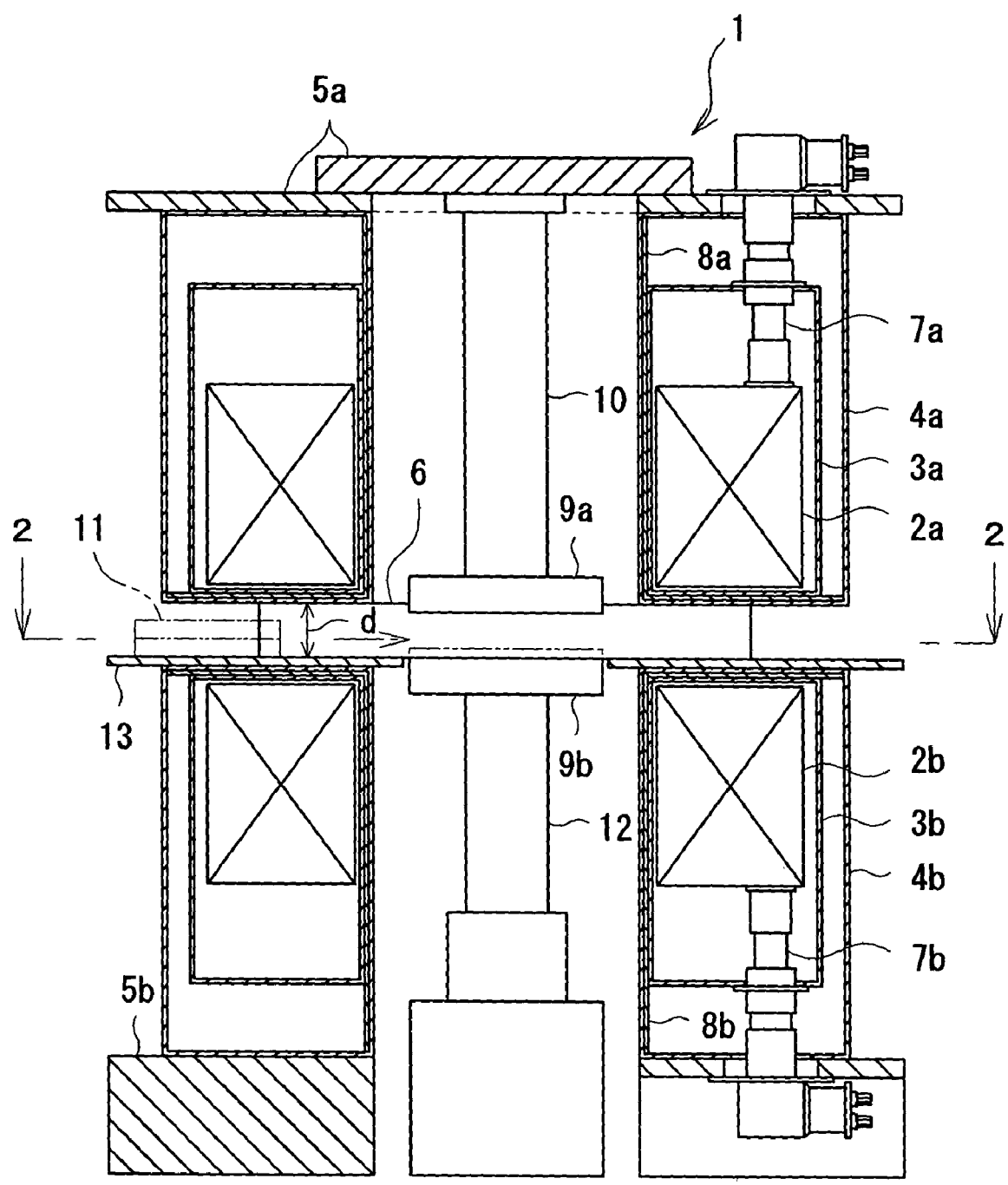
FIG. 1 is a schematic sectional view of an anisotropic formed body manufacturing apparatus according to an embodiment of the present invention.

An embodiment of the present invention will now be described with reference to the drawings.

An anisotropic formed body manufacturing apparatus 1 according to this embodiment has an upper superconducting coil 2a and a lower superconducting coil 2b, which are respectively accommodated in hollow and annular sealed containers 3a and 3b that are substantially evacuated. These sealed containers 3a and 3b are respectively accommodated in an upper casing 4a and a lower casing 4b, which are hollow and annular in configuration. The upper casing 4a is secured to an upper frame 5a, and the lower casing 4b is secured to a lower frame 5b. Between the upper casing 4a and the lower casing 4b, there is provided a spacer 6, and the upper casing 4a mounted to the upper frame 5a are supported by the spacer 6.

The split type superconducting coils 2a and 2b composed of upper and lower portions are formed into an annular configuration using, e.g., NbTi. For improved productivity, ones with a large diameter are desirable. Thus, the coils have an inner diameter of at least 200 mm or more, and more preferably, an inner diameter of 300 mm or more. These superconducting coils 2a and 2b generate a uniform and parallel magnetic field in which the magnetic lines of force are at equal intervals and parallel to each other. The magnetic flux density thereof is at least 1 to 10 T. Further, the difference in magnetic flux density in the transverse direction of the uniform and parallel magnetic field is within a range of ±1%. Further, the diameter of the uniform and parallel magnetic field is 300 to 1000 mm. An example of the specific construction of the superconducting coils 2a and 2b, generating such a uniform and parallel magnetic field, is disclosed in JP2001-264402A invented by Kiyoshi et al. filed on Mar. 17, 2000 in Japan, and it is possible to realize the superconducting coils based on this example. The teachings described in this patent application are hereby incorporated by reference. Refrigerators 7a and 7b are respectively mounted to the superconducting coils 2a and 2b. The refrigerators are supplied with refrigerants provided from a pressure feeding device (not shown) to cool the superconducting coils 2a and 2b. That is, the superconducting coils 2a and 2b of this embodiment are cooled by using a refrigerator which can achieve a forced-flow cooling or a conduction cooling.

Between the upper superconducting coil 2a and the lower superconducting coil 2b, and more specifically, between the upper casing 4a and the lower casing 4b (slidable receiving plate 12), there is formed, by means of the spacer 6, a gap d whose height is larger than that of a mold described below. In the manufacturing apparatus 1 of this embodiment, this gap d is utilized as a "transfer opening" for the mold.

Between the outer side surfaces of the sealed containers 3a and 3b and the inner side surfaces of the casings 4a and 4b, there are mounted heat insulating materials 8a and 8b consisting of glass wool, hard urethane, or the like to insulate the sealed containers 3a and 3b from heat generated by heating devices 9a and 9b.

The superconducting magnet device of this embodiment is constructed as described above.

Next, the heating devices of this embodiment will be described. The upper heating device 9a is mounted to the lower end of a column 10 extending vertically downwards through the cylindrical interior of the upper casing 4a, and is adapted to heat the mold 11 from above. The lower heating device 9b is mounted to the upper end of a slide 12, which extends through the cylindrical interior of the lower casing 4b and serves as a "drive device" driven by a hydraulic cylinder, an electric motor, or the like. The lower heating device 9b is adapted to heat the mold 11 from below. Thus, the lower heating device 9b is vertically movable, and capable of moving toward and away from the upper heating device 9a. The lower heating device 9b is upwardly displaced with the mold 11 placed thereon to thereby bring the mold 11 into contact with the upper heating device 9a. To thus place the mold 11 on the lower heating device 9b, the mold 11 is brought from outside the manufacturing apparatus 1 onto an annular, disc-like slidable receiving plate 13 mounted to the upper surface of the lower casing 4b, and the mold is caused to slide thereon to be placed on the lower heating device 9b.

Next, an anisotropic formed body manufacturing method according to an embodiment, using the above manufacturing apparatus 1, will be described. In this embodiment, the anisotropic formed body to be obtained is a sheet-like anisotropic conductive connector. This anisotropic conductive connector uses silicone rubber as the matrix and nickel particles as the functional fine particles.

First, the mold 11 is previously filled with a liquid molding material composed of liquid silicone rubber containing nickel particles. More specifically, the mold 11 is composed of upper and lower mold portions, and the cavity to form the outer contour of the anisotropic conductive connector, formed in the lower mold portion 11b, is filled with the liquid molding material. The upper mold portion 11a is used as a lid for closing the lower mold portion 11b.

Figure 2:
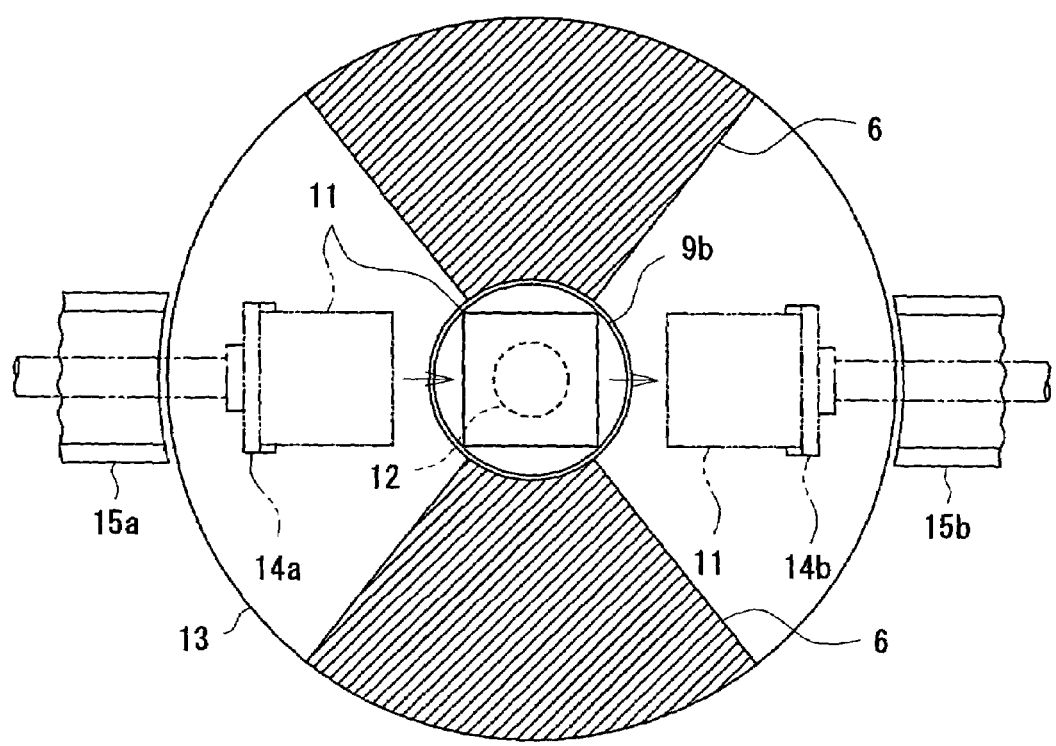
FIG. 2 is a schematic plan view taken along the line 2-2 of FIG. 1.

Next, as shown in FIG. 2, this mold 11 is pushed by a transfer device 14a composed of a straight feeder or the like provided in the manufacturing apparatus 1, and is transferred to the interior of the manufacturing apparatus 1. During this transfer, the mold 11 is caused to slide on the slide recipient plate 13 through a transfer plate 15a. The height of the lower heating device 9b is previously adjusted by the vertically movable slide 12 such that its upper surface is substantially flush with the upper surface of the slide recipient surface 13 (See FIG. 1). When the mold 11 has been placed at a predetermined position on the lower heating device 9b, the transfer device 14a retreats, and the lower heating device 9b is caused to ascend by the slide 12 until the mold 11 comes into contact with the upper heating device 9a.

Figure 3:
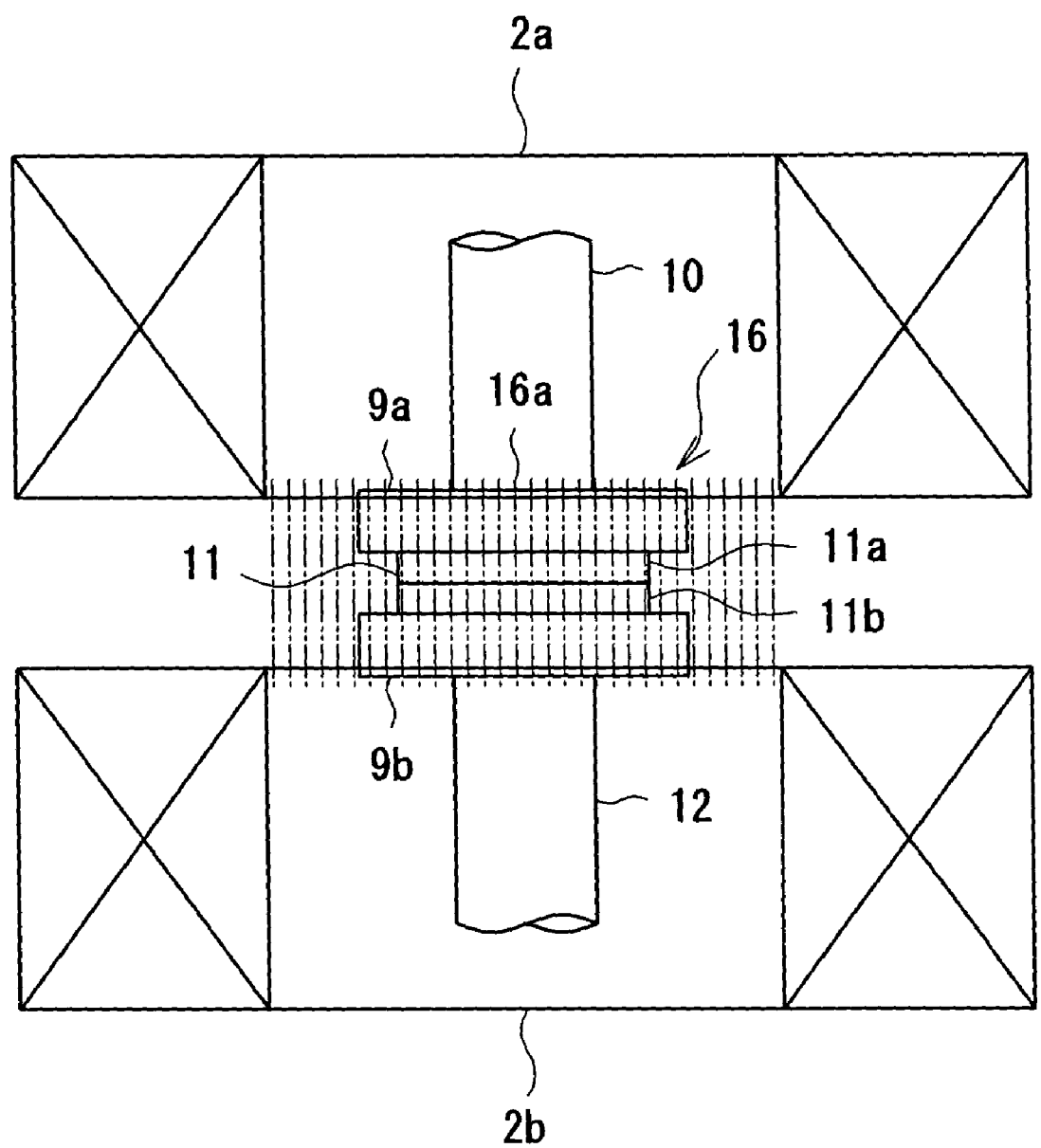
FIG. 3 is a schematic explanatory view of a uniform parallel magnetic field generated by a superconducting coil provided in the manufacturing apparatus of FIG. 1.

Then, the mold 11 is heated for a predetermined period of time while being sandwiched between the upper heating device 9a and the lower heating device 9b, and the liquid silicone rubber is further softened. In the meantime, the upper superconducting coil 2a and the lower superconducting coil 2b form a uniform and parallel magnetic field 16, in which, as shown in FIG. 3, the magnetic lines of force 16a are at equal intervals and are parallel to each other in a planar direction. As a result, in the mold 11, the nickel particles constituting the functional fine particles are easily oriented in the vertical direction along the uniform and parallel magnetic field 16 within the liquid silicone rubber further softened by being heated by the heating devices 9a and 9b, whereby an anisotropic conductive portion is formed. Thereafter, heating is performed at still higher temperature to crosslink the liquid silicone rubber, thereby fixing the orientation of the nickel particles in the anisotropic conductive portion. After the completion of this molding process, the lower heating device 9b is lowered by the slide 12 until its upper surface becomes substantially flush with the upper surface of the slide recipient plate 13. Then, as shown in FIG. 2, the mold 11 is pulled by a transfer device 14b composed of a straight feeder or the like provided in the manufacturing apparatus 1, and is brought to the exterior of the manufacturing apparatus 1 by means of a transfer plate 15b.

In the anisotropic conductive connector obtained by the above forming method, it is possible to form the anisotropic conductive portion in which the nickel particles are oriented with precision and in a fine pitch. Further, it is possible to form such a conductive portion in a large area. Thus, the connector can be used for connection, for example, between a liquid crystal display and a printed circuit board.

Instead of the mold 11 used in the above embodiment, it is possible to adopt a mold with a ferromagnetic substance embedded therein so that magnetic lines of force may be formed at desired positions in the mold. By thus realizing a magnetic circuit design in the mold, it is possible to make the intervals of the magnetic lines of force in the uniform and parallel magnetic field partially different.

While in the above embodiment a single mold 11 is supplied to the manufacturing apparatus 1, it is also possible to supply the manufacturing apparatus 1 with a plurality of molds 11 stacked together or arranged in a planar direction, performing simultaneous molding with a plurality of molds.

While in the above embodiment silicone rubber is used as the matrix and nickel particles as the functional fine particles, these allow modifications according to the anisotropic formed body to be obtained. With such modifications, the period of time and temperature for the heating by the heating devices 9a and 9b are appropriately changed.

While in the above embodiment the superconducting coils 2a and 2b are cooled by the cooling system using the refrigerators 7a and 7b to thereby realize the manufacturing apparatus 1 in a generally simple construction, it is also possible to adopt the immersion cooling system if such simplification in apparatus construction is not desired.

While in the above embodiment the heat insulating portion has the heat insulating materials 8a and 8b, it is also possible to provide a water cooling pipe for heat insulation.

Figure 4:
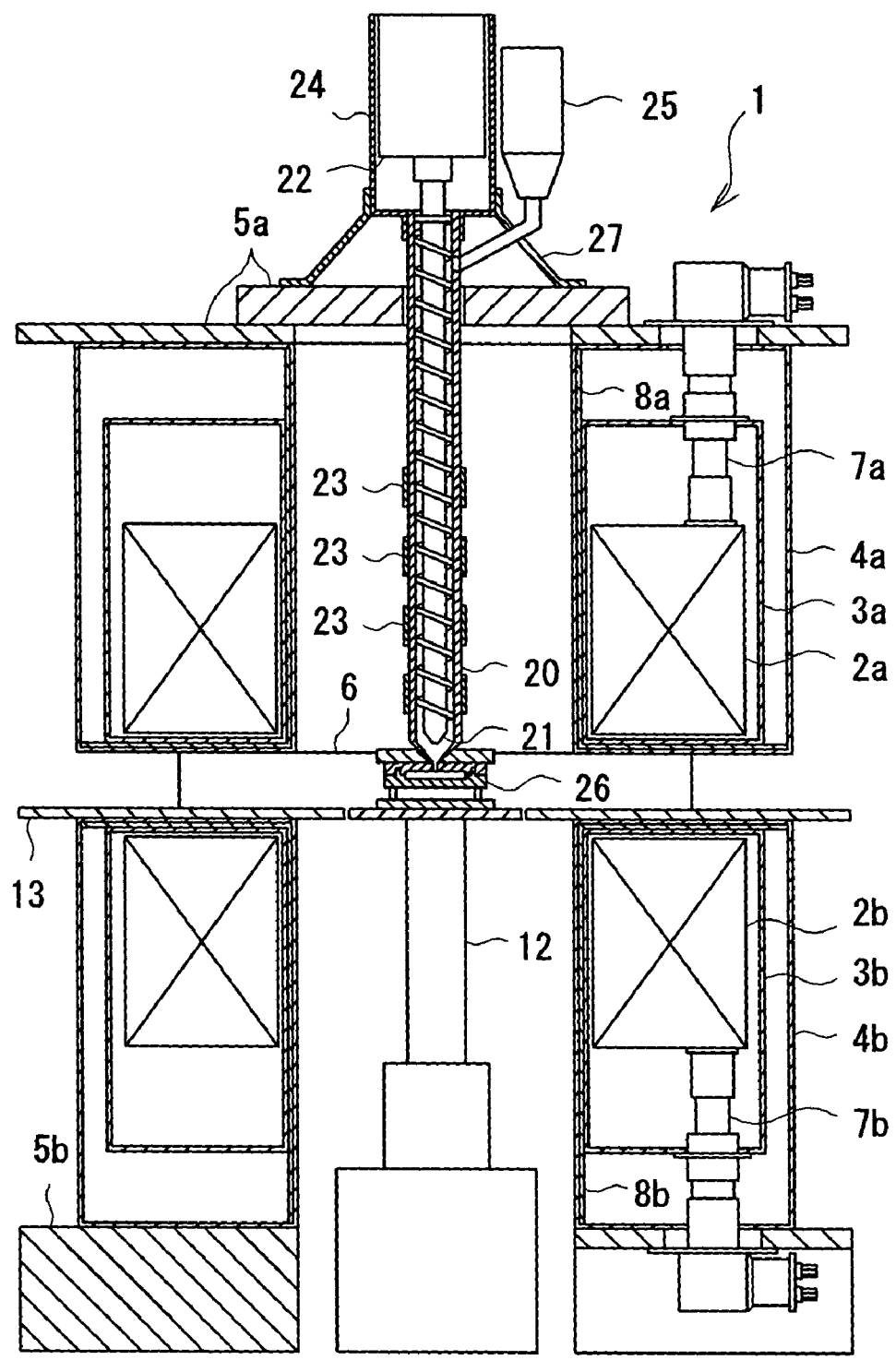
FIG. 4 is a schematic sectional view of an anisotropic formed body manufacturing apparatus according to another embodiment of the present invention.
Figure 5:
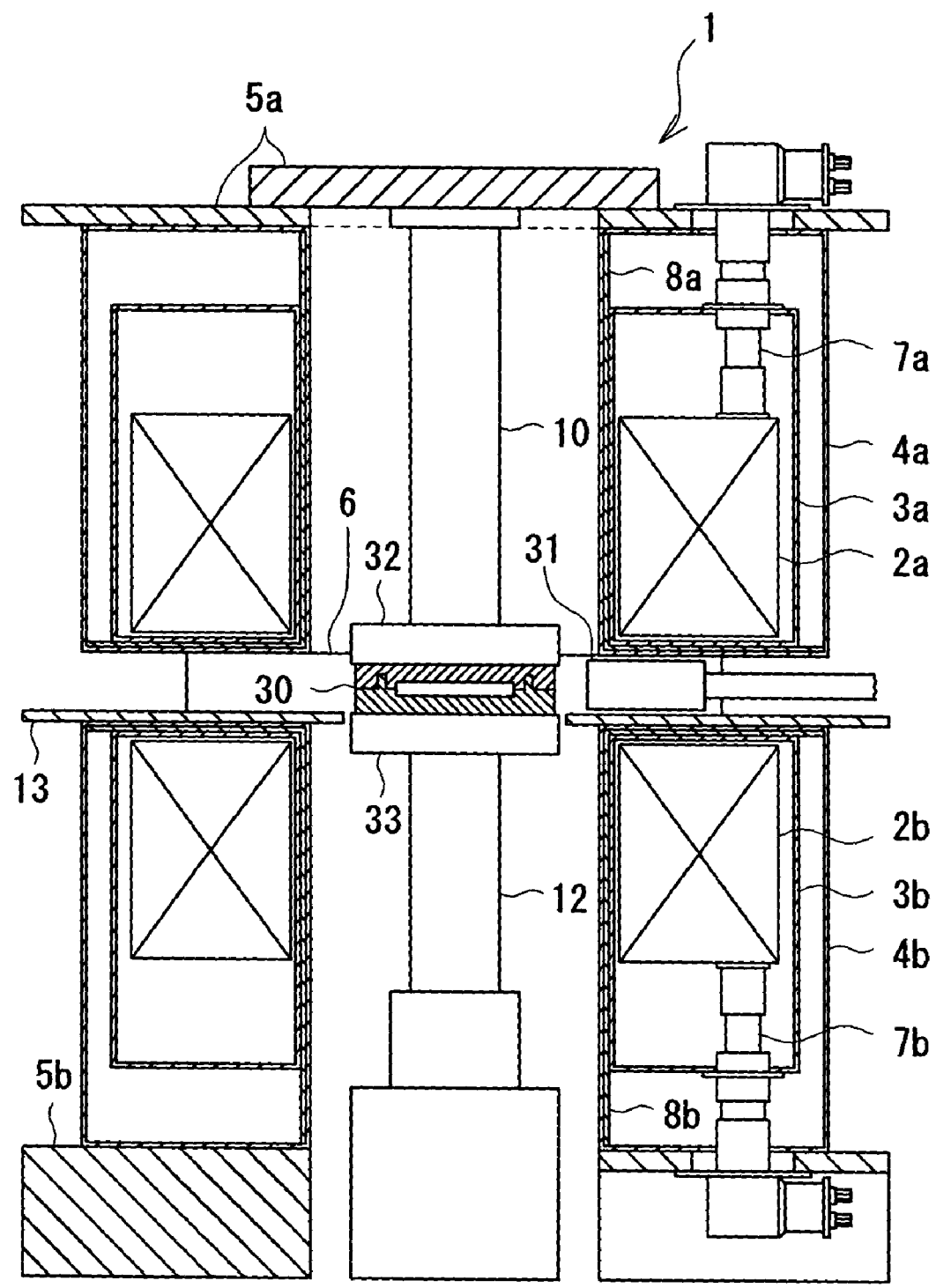
FIG. 5 is a schematic sectional view of an anisotropic formed body manufacturing apparatus according to still another embodiment of the present invention.

Instead of the manufacturing apparatus 1 of the above embodiment, it is also possible, for example, to adopt manufacturing apparatuses as shown in FIGS. 4 and 5. In the manufacturing apparatus 1 shown in FIG. 4, an injection molding device is provided. This injection molding device is equipped with a cylinder 20, a screw 21, a drive source 22 for driving the screw 21 composed of an injection cylinder and a hydraulic motor or the like, a heater 23, a bracket 24 accommodating the drive source 22, a hopper 25, an injection mold 26, etc. The bracket 24 is fixed to the upper frame 5a through the intermediation of an angle member 27, whereby the entire injection molding device is secured in position. The opening and closing of the mold 26 is effected through the vertical movement of the slide 12, and the releasing of the anisotropic formed body is effected by an adsorption nozzle or the like (not shown). Thus, also with the anisotropic formed body manufacturing apparatus 1 shown in FIG. 4, it is possible to obtain, through injection molding, an anisotropic formed body in which the functional fine particles are oriented so as to be at equal intervals and parallel to each other by a uniform and parallel magnetic field generated by the upper superconducting coil 2a and the lower superconducting coil 2b. In the manufacturing apparatus 1 shown in FIG. 5, a photo-setting molding device is provided inside the upper casing 4a and the lower casing 4b. The photo-setting molding device is equipped with a photo-setting mold 30 formed of a transparent material such as acrylic resin or glass, and a light source device 31 using ultraviolet laser or the like. Reference numerals 32 and 33 indicate support members on which the photo-setting mold 31 is to be placed. Thus, also with the anisotropic formed body manufacturing apparatus 1 shown in FIG. 5, it is possible to obtain, through photo-setting molding, an anisotropic formed body in which the functional fine particles are oriented so as to be at equal intervals and parallel to each other by a uniform and parallel magnetic field generated by the upper superconducting coil 2a and the lower superconducting coil 2b.

While in the above embodiment a split type superconducting coil composed of the upper superconducting coil 2a and the lower superconducting coil 2b are used as an example, it is also possible to use a unitary superconducting coil.

According to the apparatus and method for manufacturing an anisotropic formed body of the present invention, a uniform and parallel magnetic field, which can not be generated by permanent magnets, is used to orient functional fine particles at equal intervals and parallel to each other, which is difficult to effect with permanent magnets, whereby it is possible to obtain various anisotropic formed bodies exhibiting, uniformly and in parallel, various properties, such as electrical conductivity, heat conductivity, expansion coefficient, light transmittance, magnetism, hardness, elasticity, water absorption, dielectric constant, gas permeability, piezoelectric characteristics, and vibration absorption. The anisotropic formed bodies thus obtained can be used in a variety of technical fields.

What is claimed is:

1. An apparatus for manufacturing an anisotropic formed body in which functional, magnetic fine particles are oriented in a specific direction within a matrix and in which anisotropy is given to properties attributable to the functional fine particles, comprising:
   a superconducting magnet device that has a cylindrical superconducting coil and generates a uniform and parallel magnetic field in which magnetic lines of force at equal intervals and parallel to each other extend through a mold arranged in a barrel axis of the superconducting coil;
   a heating device adapted to heat in the mold a liquid molding material with the functional fine particles contained in the matrix, said heating device being disposed within a transfer opening; and
   a drive device adapted to drive at least one of the mold and the heating device in the barrel axis direction of the superconducting coil,
   wherein the cylindrical superconducting coil is composed of an upper superconducting coil and a lower superconducting coil vertically spaced apart from each other, and
   wherein a gap between the upper and lower coils constitutes the transfer opening for the mold.

2. An apparatus for manufacturing an anisotropic formed body according to claim 1, further comprising an injection molding device using an injection mold as the mold.

3. An apparatus for manufacturing an anisotropic formed body according to claim 1, further comprising a photo-setting molding device using a photo-setting mold as the mold.

4. An apparatus for manufacturing an anisotropic formed body according to claim 1, further comprising a refrigerator for cooling the superconducting coil by a forced-flow cooling or a conduction cooling.

5. An apparatus for manufacturing an anisotropic formed body according to claim 1, wherein the superconducting magnet device generates a uniform parallel magnetic field having a magnet flux density of 1 to 10 T.

6. An apparatus for manufacturing an anisotropic formed body according to claim 1, wherein the superconducting magnet device generates a uniform parallel magnetic field having a diameter of 300 to 1000 mm.

7. An apparatus for manufacturing an anisotropic formed body according to claim 1, wherein the superconducting coils are formed into an annular configuration and have an inner diameter of at least 200 mm or more.

8. An apparatus for manufacturing an anisotropic formed body, the apparatus comprising:
   a cylindrical superconducting coil having a first superconducting coil and a second superconducting coil; and
   a heating device adapted to heat a mold, said heating device being disposed within a transfer opening, wherein:
   said first and second superconducting coils are structurally adapted to generate a magnetic field,
   said transfer opening separates said first second superconducting coil from said second superconducting coil, and
   said mold, when disposed within said transfer opening, has said magnetic field extending therethrough.

9. An apparatus for manufacturing an anisotropic formed body according to claim 8, wherein said magnetic field has uniform and parallel magnetic lines of force.

10. An apparatus for manufacturing an anisotropic formed body according to claim 8, wherein a liquid molding material encased within said mold includes functional fine particles within a matrix oriented in a specific direction,
   said magnetic field orienting said functional fine particles in said specific direction.

11. An apparatus for manufacturing an anisotropic formed body according to claim 8, wherein said mold includes a first mold portion and a second mold portion, said first and second mold portions being adapted to encase a molding material.

12. An apparatus for manufacturing an anisotropic formed body according to claim 8, wherein said mold includes a first mold portion and a second mold portion, and said heating device includes a first heating device and a second heating device, said first heating device heating said first mold portion and said second heating device heating said second mold portion.

13. An apparatus for manufacturing an anisotropic formed body according to claim 12, wherein said second heating device is moveable toward and away from said first heating device.

14. An apparatus for manufacturing an anisotropic formed body according to claim 8, further comprising:

an injection molding device using an injection mold as said mold.

15. An apparatus for manufacturing an anisotropic formed body according to claim 8, further comprising:

a photo-setting molding device using a photo-setting mold as said mold.

16. An apparatus for manufacturing an anisotropic formed body according to claim 8, further comprising:

a refrigerator for cooling said first and second superconducting coils.

17. An apparatus for manufacturing an anisotropic formed body according to claim 1, wherein the drive device drives the mold in the barrel axis direction.

18. An apparatus for manufacturing an anisotropic formed body according to claim 1, wherein the drive device drives the heating device in the barrel axis direction.

19. An apparatus for manufacturing an anisotropic formed body according to claim 8, further comprising:

a drive device is adapted to drive at least one of the mold and the heating device in the barrel axis direction of the superconducting coil.

20. An apparatus for manufacturing an anisotropic formed body according to claim 19, wherein the drive device drives the mold in the barrel axis direction.

21. An apparatus for manufacturing an anisotropic formed body according to claim 19, wherein the drive device drives the heating device in the barrel axis direction.

* * * * *